United States Patent [19]
Ohta et al.

[11] Patent Number: 5,267,772
[45] Date of Patent: Dec. 7, 1993

[54] STRUCTURE OF REAR BODY PORTION FOR AN AUTOMOTIVE VEHICLE

[75] Inventors: Michitaka Ohta; Hiroaki Kodama, both of Hiroshima, Japan

[73] Assignee: Mazda Motor Corporation, Hiroshima, Japan

[21] Appl. No.: 889,894

[22] Filed: May 29, 1992

[30] Foreign Application Priority Data

May 29, 1991 [JP] Japan ............................ 3-125962

[51] Int. Cl.$^5$ ............................................. B62D 25/00
[52] U.S. Cl. ..................................... 296/189; 296/195
[58] Field of Search ............... 296/189, 188, 195, 194

[56] References Cited

U.S. PATENT DOCUMENTS 4,684,151 8/1987 Drewek ........................ 296/189
5,118,160 6/1992 Kitagawa et al. ............. 296/189
5,125,715 6/1992 Kijima ........................... 296/189

FOREIGN PATENT DOCUMENTS 244573 3/1990 Japan .

*Primary Examiner*—Robert R. Song
*Attorney, Agent, or Firm*—Keck, Mahin & Cate

[57] ABSTRACT

A rear body structure of a vehicle body has a crushable reinforcement disposed inside a rear fender panel and extending in a lengthwise direction for structurally reinforcing a rear body portion of the vertical body. The crushable reinforcement is controlled so as to crush in an intended pattern during a rear-end collision. Consequently, the impact energy generated during the rear-end collision and applied to the automotive vehicle body is absorbed.

16 Claims, 9 Drawing Sheets

STRUCTURE OF REAR BODY PORTION FOR AN AUTOMOTIVE VEHICLE

BACKGROUND OF THE INVENTION

1. Field of the Invention

This invention relates to a structure of a rear portion of a vehicle body for an automotive vehicle. More particularly, the invention relates to a rear body structure of an automotive vehicle in which deformation characteristics of what is referred to as a "belt line" portion of the rear body are improved.

2. Description of Related Art

Rear bodies, including rear passenger compartments, of automotive vehicles typically have various reinforcement structures for preventing deformation of the vehicle bodies upon rear-end collisions. It has been known, for example, to provide reinforcements which strengthen structures defining openings in vehicle bodies such as door openings. Such a reinforcement usually constitutes a closed cross-sectional structure, in combination with a quarter panel, in what is known as a "belt line" portion of the rear body. A rear body structure such as this is, for instance, disclosed by Japanese Unexamined Utility Model Publication No. 2-44,573.

Another structure for reinforcing a rear body includes a rear pillar to which a front end of a reinforcement for reinforcing a belt line portion (hereafter referred to as a belt line reinforcement) of the rear vehicle body is attached.

In the event of a rear-end collision, enhanced protection is provided by a belt line reinforced rear cabin. The cabin has a "crumple zone" intended to absorb the energy of an impact before it reaches the passengers in the rear cabin. However, since the prior art belt line reinforcement, which is shaped as a flanged U-shaped channel, is secured to the quarter panel, only a rear portion of the belt line reinforcement crushes upon the occurrence of a rear-end collision. Consequently, the belt line reinforcement is sometimes insufficiently crushed. If the belt line reinforcement does in fact crush insufficiently, the rear pillar is thrust forward by the belt line reinforcement. This leads to easy deformation of the structure defining a body opening, such as a door opening, in the rear body.

On a side of the belt line reinforcement, there is conventionally disposed a suspension tower for supporting an upper end of a suspension apparatus. In this case, forward displacement of the belt line reinforcement, caused by a rear-end collision, may force the suspension tower to move forward greatly, causing a harmful influence on the suspension apparatus.

SUMMARY OF THE INVENTION

It is an object of the present invention to provide a rear body structure for an automotive vehicle in which deformation of a rear body reinforcing structure is controlled so that it is crushed in an intended crush pattern during a collision so as to absorb the impact energy of the collision.

It is another object of the present invention to provide a rear body structure for an automotive vehicle which minimizes deformation of a structure defining a door opening in the rear body so that this deformation is as small as possible in the event of a rear-end collision.

These objects are achieved by providing a rear body structure of an automotive vehicle body in which a rear body portion is defined by a rear fender panel forming an outer wall of the rear body portion and a rear pillar secured to and extending from a side sill so as to form a rear door opening. The rear body structure is provided with a suspension tower for supporting a rear suspension approximately midway thereof in a lengthwise direction of the automotive vehicle body. The rear body portion is structurally reinforced in the lengthwise direction by a reinforcement, which is crushable in the event of a collision, and particularly, a rear-end collision. The reinforcement is formed in or as a generally closed cross-sectional channel by a quarter panel, forming an inner wall of the rear body portion, which is secured to the rear fender panel, and a belt line reinforcement, formed as a generally U-shaped channel and extending between the rear fender panel and the quarter panel along the length of the rear body portion, which is secured to the quarter panel. The reinforcement is controlled by a crush pattern control means so as to cause an intended pattern of deformation of the rear body portion in the event of a rear-end collision. The impact energy of the rear-end collision applied to the automotive vehicle body is absorbed during this deformation.

The crush pattern control means of the rear body structure has front crush pattern control means for causing an intended lengthwise deformation of a front half portion of the rear body portion, which is located in front of a suspension tower as viewed in the lengthwise direction, and rear crush pattern control means for causing an intended lengthwise deformation of a rear half portion of the rear body portion, behind the suspension tower.

During a rear-end collision of an automotive vehicle with a rear body structured in this way, enhanced protection is provided by a reinforcement structure having a rear crumple zone designed to absorb the energy of an impact before it reaches the passengers in the rear passenger cabin. The reinforcement structure, which is formed as a generally closed cross-sectional channel by the belt line reinforcement and the quarter panel, crushes at its rear end portion in an intended crush pattern. Simultaneously, the reinforcement structure is controlled so that it initially bends and deforms at its rear half portion, located in front of a rear suspension, and then at its front half portion. The reinforcement structure, therefore, bends and curves at the front half portion inward or outward and vice versa at its rear half portion, or in the same transverse direction, thereby producing an S-shaped or W-shaped deformation along its length. Consequently, a large lengthwise deformation of the reinforcement structure is caused, so that the impact energy is effectively absorbed before it reaches the passengers in the event of a rear-end collision. The reinforcement structure, which provides such a large lengthwise deformation, suppress its own forward displacement so that it is as small as possible, thereby preventing the door frame structure from being greatly deformed.

BRIEF DESCRIPTION OF THE DRAWINGS

The above and other objects and features of the present invention will be apparent to those skilled in the art from the following description of a preferred embodiment when considered in conjunction with the attached drawings. In the drawings, the same reference numerals have been used to designate the same or similar elements throughout the drawings, and.

BRIEF DESCRIPTION OF THE PREFERRED EMBODIMENTS

Because left and right sides of a rear body portion of an automotive vehicle have substantially the same structures, the following description will be directed only to the structure of the left side rear body portion.

Figure 1:
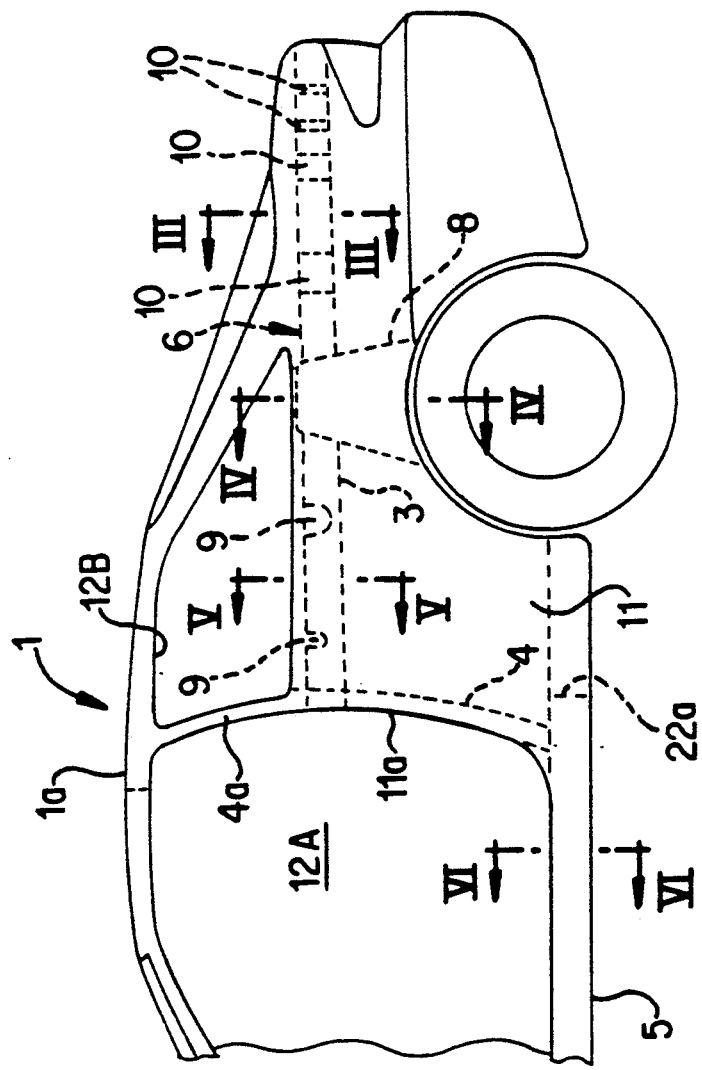
FIG. 1 is a side view showing a rear body portion of an automotive vehicle in accordance with a preferred embodiment of the present invention.
Figure 2:
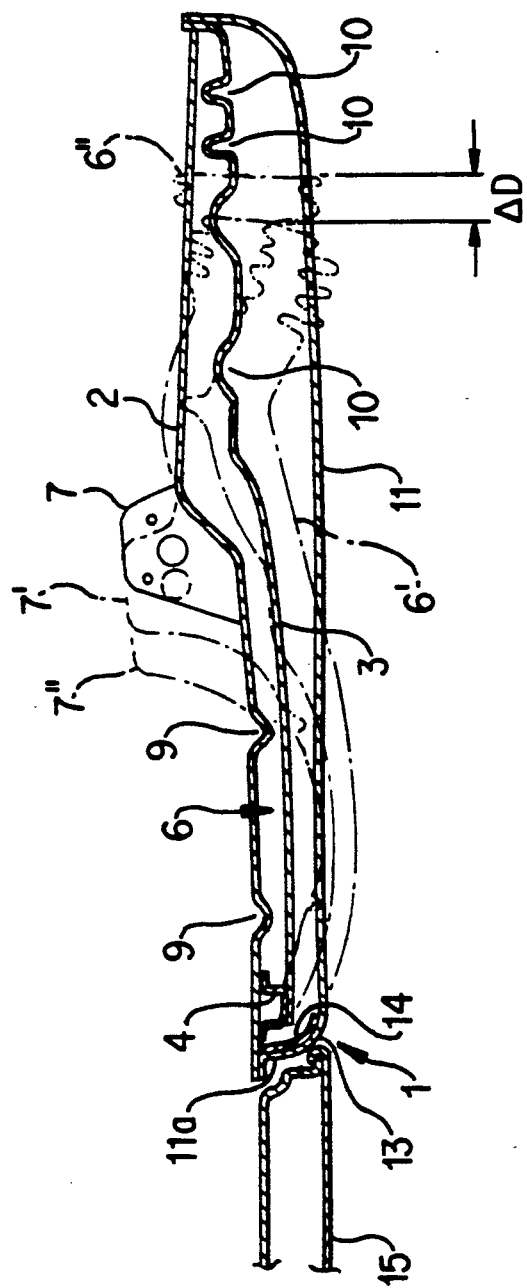
FIG. 2 is a longitudinal cross-sectional view showing a reinforcing structure of the rear body portion of FIG. 1.
Figure 3:
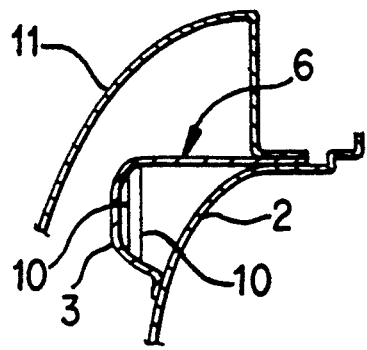
FIGS. 3 to 6 are enlarged cross-sectional views of FIG. 2 along lines III—III, IV—IV, V—V and VI—VI, respectively.

Referring to the drawings in detail and, in particular, to FIGS. 1 and 2, a rear body structure of an automotive vehicle in accordance with a preferred embodiment of the present invention, including a rear cabin, is shown. The rear body structure is formed by a rear fender panel 11, constituting an outer body wall. The rear fender panel 11 is formed with part of a rear door opening 12A along its front vertical edge 11a and has a rear window opening 12B therein. The rear fender panel 11 is secured at its lower margin to a side sill 5. One side sill 5 extends in a lengthwise direction of the vehicle body on each side of the vehicle body. Inside the rear fender panel 11, a rear quarter panel 2, constituting an inner body wall of the rear body 1, is incorporated. Between the rear fender panel 11 and the rear quarter panel 2, an elongated reinforcement 3 is provided along what is called a belt line portion of the rear body 1. This belt line portion is defined along almost the whole length of the rear body 1, just below the rear window opening 12B. Because of this definition of the belt line portion, the elongated reinforcement 3 is termed a "belt line reinforcement." The belt line reinforcement 3 is secured at its front end to a rear pillar reinforcement 4, extending from the side sill 5 to the roof 1a. The rear pillar reinforcement 4 partly forms a rear pillar 4a. The belt line reinforcement 3, which is specifically shaped in the form of a flanged U-shaped channel, is welded to the quarter panel 2 so as to constitute a closed cross-sectional reinforcement structure 6, as is most clearly shown in FIGS. 3 to 5.

Figure 4:
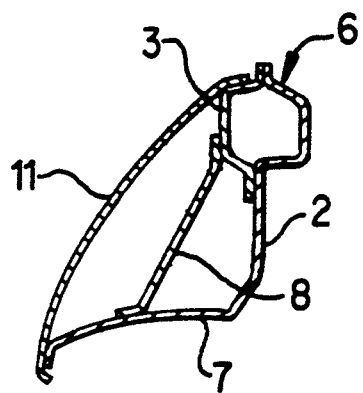
Figure 5:
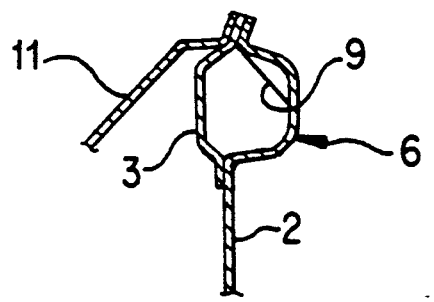

At approximately halfway along the rear body 1 in the lengthwise direction, the reinforcement structure 6 is provided with a suspension tower 7 for supporting an upper portion of a suspension apparatus (not shown). As is shown in FIG. 4, the suspension tower 7 is formed by a lower portion of the quarter panel 2 and a suspension tower reinforcement 8, disposed between the quarter panel 2 and the rear fender panel 11, which is secured at its lower end to the quarter panel 2 and at its upper end to the belt line reinforcement 3 so as to form a closed cross-section. For forming the reinforcement structure 6, the quarter panel 2 is provided with an upper portion which projects inside, i.e., toward the rear passenger cabin, along almost all of its front half portion in front of the suspension tower 7. In other words, the reinforcement structure 6 is shaped as an elongated tube extending in the lengthwise direction along the belt line portion of the rear body.

Reinforcement structure 6 has a crush pattern control means for controlling a crush pattern of the rear body 1 in the event of a rear-end collision. The crush pattern control means includes a plurality of beads 9 and 10. Specifically, the quarter panel 2 is provided with a plurality of vertical beads 9 formed in its front half portion forward of the suspension tower 7. In this embodiment, two such vertical beads 9 are provided. Each vertical bead 9 is shaped in the form of an indentation projecting towards the belt line reinforcement 3. Similarly, the belt line reinforcement 3 is provided with a plurality of vertical beads 10 formed in its rear half portion rearward of the suspension tower 7. In this embodiment, four such vertical beads 10 are provided. Each vertical bead 10 is shaped in the form of an indentation projecting towards the quarter panel 2. During a rear end collision, such a crush pattern control means allows the front portion of the reinforcement structure 6 to bend toward the outside of the rear body 1 and the rear portion of the reinforcement structure 6 to bend toward the inside of the rear body 1. That is, the reinforcement structure 6 bends in opposite directions between its front and rear portions.

As is apparent from FIG. 1, the beads are different in width. That is, the vertical beads 9 of the quarter panel 2 are formed larger as they progress from front to rear so as to cause the reinforcement structure 6 to initially bend or crush at the larger or rear vertical bead 9, and then at the smaller or front vertical bead 9, during a rear-end collision. On the other hand, the first two vertical beads 10 of the belt line reinforcement 3 are larger in width than the other two vertical beds 10. The first two vertical beads 10, therefore, bend and cause the reinforcement structure 6 to initially crush at the larger or first two vertical beads 10, and then at the remaining two smaller vertical beads 9, during a rear-end collision.

Figure 7:
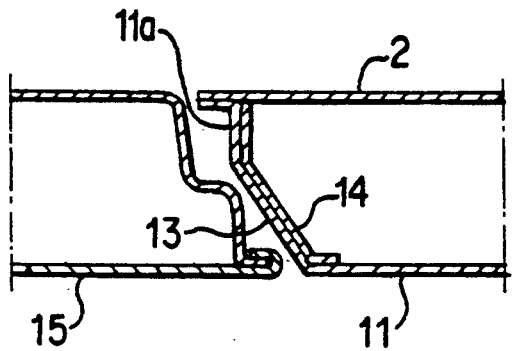
FIG. 7 is a sectional view showing an interface between a door and the rear body portion.

As is shown in FIG. 7, the rear fender panel 11 is formed with a trimmed door frame 13 along its front vertical edge 11a. Inside the trimmed door frame 13, a reinforcement corner strip 14 is secured to the inner surface of the rear fender panel 11, opposite to the front end of the belt line reinforcement 3, so as to reinforce a vertical side of a door frame 13 for defining the door opening 12.

Figure 6:
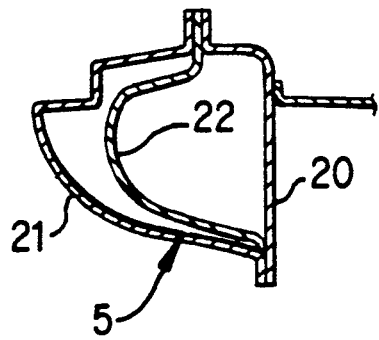

Referring to FIG. 6, the side sill 5 is formed by an inner side sill wall 20 and an outer side sill wall 21, which are secured to each other so as to form a closed cross section. Between the inner and outer side sill walls 0 and 21, there is a side sill reinforcement 22 which divides the interior space into two portions. Ordinarily, the side sill reinforcement 22 is installed in the side sill 5 for the door opening 12.

Figure 9:
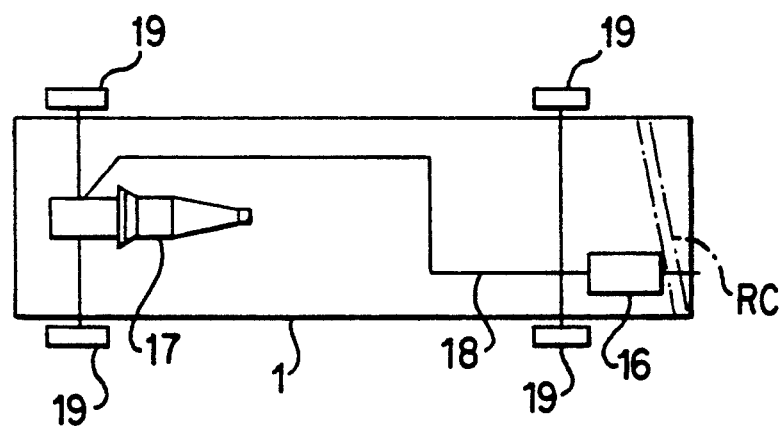
FIG. 9 is a schematic bottom view showing an arrangement of lower elements of the automotive vehicle of FIG. 1.

Under the rear body 1, several elements of a power train system and an exhaust system are arranged. As is shown in FIG. 9, such elements may include a power unit 17 and an exhaust pipe 18 equipped with a silencer 16. The exhaust pipe 18 extends in the lengthwise direction partly along one side of the rear body 1 and partly along the other side of the rear body 1. Front and rear wheels are indicated by reference number 19. The side sill reinforcement 22 of the side sill 5, on the side where the silencer 16 is disposed, has a rear end extension 22a which extends beyond the rear pillar reinforcement 4 to which the side sill 5 is secured. Providing the rear end extension 22a of the side sill reinforcement 22 enhances an increase in structural stiffness of the rear body 1 in the lengthwise direction. If the automotive vehicle has two exhaust systems, each having a silencer 16 disposed at each side of the rear body 1, the side sill reinforcement 22 in each side sill 5 is formed with a rear end extension 22a.

In the event of a rear-end collision of the automotive vehicle having a rear body which is thus structured, enhanced protection is provided by the reinforcement structure 6, which has a rear crumple zone designed to absorb the energy of an impact before it reaches the passengers in the rear passenger cabin. That is, the reinforcement structure 6, formed by the belt line reinforcement 3 and the quarter panel 2, crushes at its rear end portion, as is shown by reference number 6" in FIG. 2. Simultaneously, the reinforcement structure 6 bends and deforms, initially at the large rear beads 9, and then at the small front beads 1. The reinforcement structure 6 also initially bends and deforms at the two front large beads 10 and then at the two small rear beads 10. The reinforcement structure 6, therefore, bends and curves inward at its front half portion and outward at its rear half portion, thereby producing an S-shaped deformation 6' along its length. A large lengthwise deformation of the reinforcement structure 6 is thus caused, so that the energy of an impact is effectively absorbed before it reaches the passengers in the event of a rear-end collision. By providing a large lengthwise deformation of the reinforcement structure 6 in this way, the forward displacement of the reinforcement structure 6 is made as small as possible, largely preventing the door frame defining the rear door opening 12A from being deformed. Although the suspension tower 7 displaces forward the same distance as the lengthwise deformation of the front half portion of the reinforcement structure in front of the suspension tower 7 as the reinforcement structure 6 deforms, as shown by a reference number 7' in FIG. 1, the forward displacement movement of the suspension tower 7 is suppressed and stays small.

If the reinforcement structure 6 has no crush pattern control means, as in the prior art, the rear end portion only will be crushed, as shown by a reference numeral 6" in FIG. 2, so that a large forward displacement thereof is allowed. This causes a large deformation of the rear door opening 12A and leads to insufficient absorption of the impact energy of a rear-end collision. Because the lengthwise deformation of the reinforcement means 6 is smaller, by a difference D, than that of this embodiment, the suspension tower 7 is allowed to displace forward by a distance equal to the difference D as shown by a reference number 7" in FIG. 2. As is apparent from the above comparison, the deformation of the rear door opening 12A and the forward displacement of the suspension tower 7 can be fairly small.

The front half portion of the reinforcement structure 6 in front of the suspension tower 7 causes an outward deformation upon a rear-end collision. Consequently, the front end of the reinforcement structure 6 is forced to face inward, so as to avoid interference of reinforcement structure 6 with the rear door 15, even if the door opening 12 is deformed to a small extent.

Figure 8:
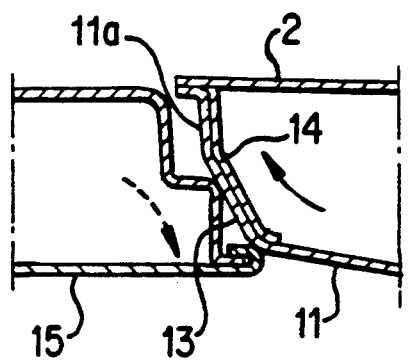
FIG. 8 is a sectional view showing an interface between the door and the rear body portion after a rear-end collision of the automotive vehicle.

Because the trimmed door frame 13 is formed along the front edge 11a of the rear fender panel 11 and the reinforcement corner strip 14, which reinforces the door frame, is secured to the inner surface of the rear fender panel 11 so as to oppose the front end of the belt line reinforcement 3, as the reinforcement structure 6 displaces forward due to a rear-end collision, the rear fender 11 can easily cause an inward deformation accompanying the deformation of the reinforcement structure 6. Also, the reinforcement corner strip 14 receives the energy of a forward displacement of the reinforcement structure 6, as is shown in FIG. 8.

If the silencer 16 is not crushed during the rear-end collision, or the rear body 1 crushes only as shown by a chained line RC in FIG. 9, the lengthwise deformation of the rear body 1, on a side at which the silencer 16 is positioned, is small as compared with the deformation on the opposite side. The side sill 5, on the side at which the silencer 5 is positioned, is subjected to a large impact from a rear-end collision. However, because the side sill extension 22a of the side sill reinforcement 22 provides the end portion of the side sill 5 with an increased stiffness, the rear portion of the side sill 5 can sufficiently withstand the impact and is prevented from being crushed or broken. This results in a suppressed forward deformation or displacement of the rear pillar reinforcement 4.

Figure 10:
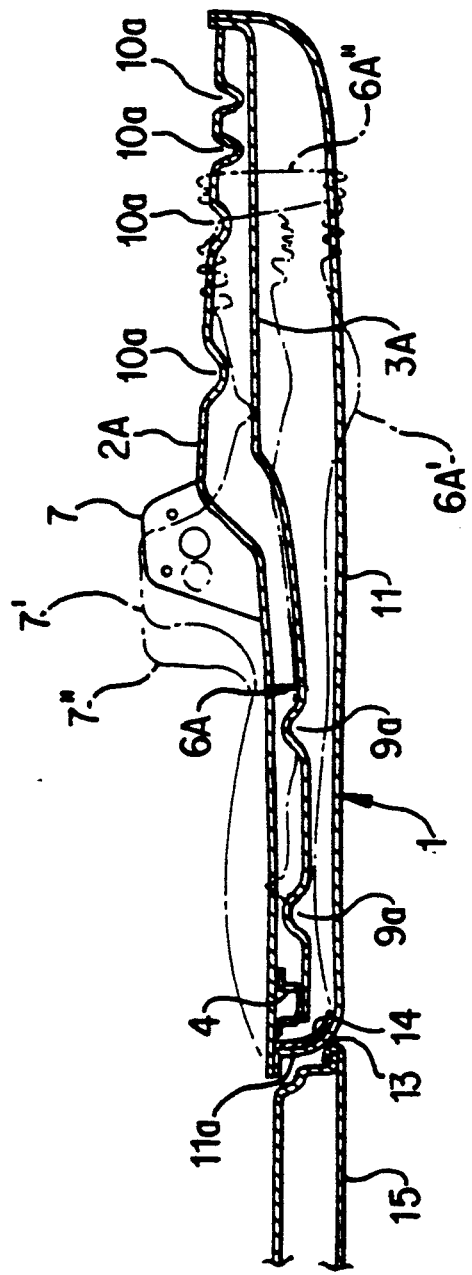
FIGS. 10, 11 and 12 are longitudinal cross-sectional views showing different rear body structures according to preferred embodiments of the invention.
Figure 11:
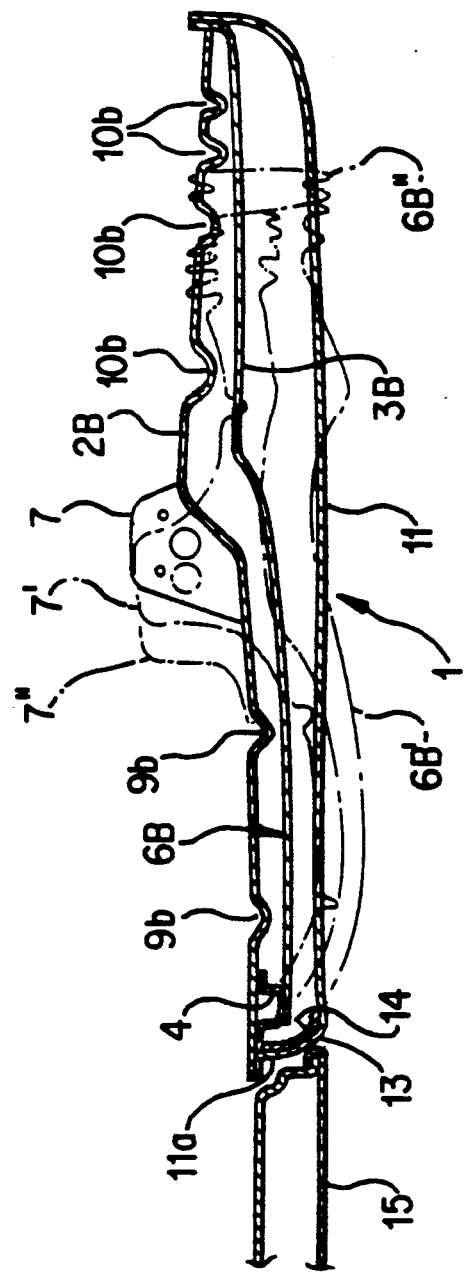
Figure 12:
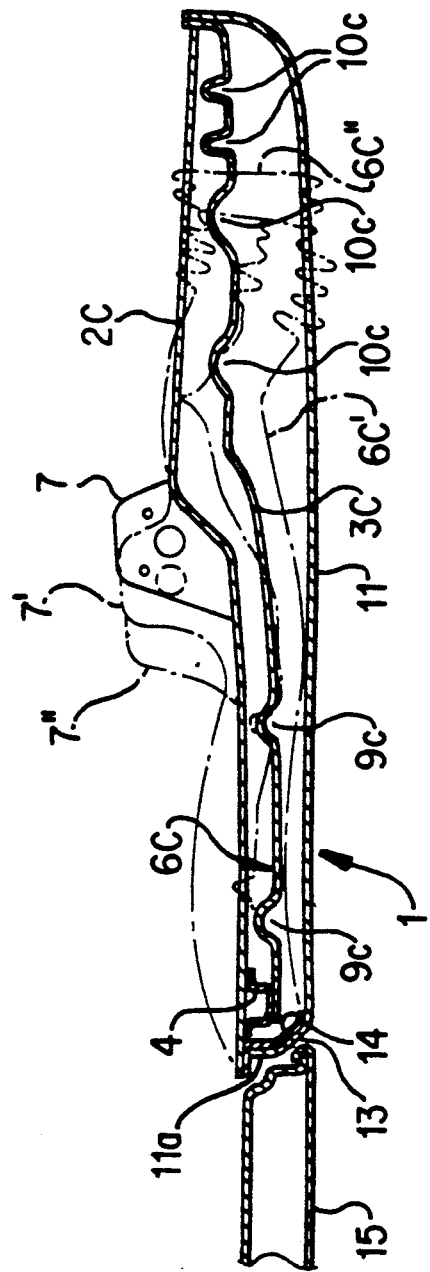

Referring to FIGS. 10 to 12, structures of a rear body of an automotive vehicle in accordance with other preferred embodiments of the present invention are shown. Because all elements and arrangements, except for a rear quarter panel and/or a belt line reinforcement, in which a crush pattern control means is incorporated, are the same in structure and operation as those of the previous embodiment, the following description will be directed primarily to the rear quarter panel and the belt line reinforcement.

As is shown in FIG. 10, a reinforcement structure 6A, which is formed by a rear quarter panel 2A and a belt line reinforcement 3A in the same manner as that of the previous embodiment, has a crush pattern control means for controlling a crush pattern of a rear body 1 in the event of a rear-end collision. The belt line reinforcement 3A is provided with a plurality of vertical beads 9a formed in its front half portion forward of a suspension tower 7. In this embodiment, two such vertical beads 9a are provided. Each vertical bead 9a is shaped as an indentation projecting towards the quarter panel 2A. Similarly, the quarter panel 2A is provided with a plurality of vertical beads 10a formed in its rear half portion rearward of the suspension tower 7. In this embodiment, four such vertical beads 10a are provided. Each vertical bead 10a is shaped as an indentation projecting towards the belt line reinforcement 3A. The vertical beads 9a of the belt line reinforcement 3A are formed larger in width as they progress from front to rear so as to cause the reinforcement structure 6A to initially bend or crush at the larger or rear vertical bead 9a, and then at the smaller or front vertical bead 9a upon a rear-end collision. On the other hand, the first two vertical beads 10a of the quarter panel 2A are the same as each other, but larger in width than the other two, so that the reinforcement structure 6A bends or is caused to initially crush at the larger or first two vertical beads 10a, and then at the remaining two smaller vertical beads 10a upon a rear-end collision. Consequently, the crush pattern control means allows, in the event of a rear-end collision, the reinforcement structure 6A to bend in opposite transverse directions between its front and rear half portions. More particularly, the front portion of the reinforcement structure 6A bends toward the inside of the rear body 1, and the rear portion of the reinforcement structure 6A bends toward the outside of the rear body 1, so as to produce an S-shaped deformation 6A' of the reinforcement structure 6A along its length.

Referring to FIG. 11, a reinforcement structure 6B, which is formed by a rear quarter panel 2B and a belt line reinforcement 3B in the same manner as in the previous embodiment, has a crush pattern control means for controlling a crush pattern of a rear body 1 in the event of a rear-end collision. The quarter panel 2B is provided with a plurality of vertical beads. In this embodiment, six vertical beads are provided. The first two vertical beads 9b are formed in a front half portion of the quarter panel 2B, forward of a suspension tower 7. The other four beads 10b are formed in a rear half portion of the quarter panel B, rearward of the suspension tower 7. All of the vertical beads 9b and 10b are shaped as indentations projecting towards the belt line reinforcement 3B. The vertical beads 9a in the front portion of the quarter panel 2B are formed larger in width as they progress from front to rear so as to cause the reinforcement structure 6B to initially bend or crush at the larger or rear vertical bead 9b, and then at the smaller or front vertical bead 9b upon a rear-end collision. On the other hand, the first two of the vertical beads 10b in the rear portion of the quarter panel 2B are the same as each other but larger in width than the other two vertical beads so that the reinforcement structure 6B initially bends and is caused to crush at the larger or first two vertical beads 10b, and then at the two remaining smaller vertical beads 10b upon a rear-end collision.

The crush pattern control means described above, in the event of a rear-end collision, allows the front and rear half portions of the reinforcement structure 6B to bend in the same transverse direction, namely, towards the outside of the rear body 1. A generally W-shaped deformation 6B' along the length of the structure is formed, therefore.

Referring to FIG. 12, a reinforcement structure 6C, which is formed by a rear quarter panel 2C and a belt line reinforcement 3C in the same manner as the previous embodiments, has a crush pattern control means for controlling a crush pattern of a rear body 1 during a rear-end collision. The belt line reinforcement 3C is provided with a plurality of vertical beads. In this embodiment, six vertical beads are provided. The first two vertical beads 9c are formed in the front half portion of the reinforcement, forward of a suspension tower 7. The other four beads 10c are formed in the rear half portion of the reinforcement, rearward the suspension tower 7. All of the vertical beads 9c and 10c are shaped as indentations projecting towards the quarter panel 2C. The vertical beads 9a of the front portion of the belt line reinforcement 3C are formed larger in width as they progress from front to rear so as to cause the reinforcement structure 6C to initially bend or crush at the larger or rear vertical bead 9c, and then at the smaller or front vertical bead 9c, upon a rear-end collision. On the other hand, the first two vertical beads 10c of the rear portion of the belt line reinforcement 3C are the same as each other but larger in width than the other two vertical beads. Consequently, the reinforcement structure 6C initially bends or is caused to crush at the larger or first two vertical beads 10c, and then at the remaining two smaller vertical beads 10c upon a rear-end collision.

The crush pattern control means according to the present invention allows the front and rear half portions of the reinforcement structure 6C to bend in the same transverse direction, namely, towards the inside of the rear body 1, during a rear-end collision. As it is deformed, therefore, the reinforcement structure 6C forms a generally W-shaped deformation 6C' along its length.

It is to be understood that although the present invention has been described in detail with respect to preferred embodiments thereof, various other embodiments and variants may occur to those skilled in the art. Any such other embodiments and variants which fall within the scope and spirit of the invention are intended to be covered by the following claims.

What is claimed is:

1. A rear body structure of a rear body portion of an automotive vehicle body, in which said rear body portion is defined by a rear fender panel forming an outer wall of said rear body portion and a rear pillar secured to and extending from a side sill so as to form a rear door opening and which is provided with a suspension tower for supporting a rear suspension approximately midway thereof in a lengthwise direction of said automotive vehicle body, said rear body structure comprising:

crushable reinforcement means, disposed inside of said rear fender panel and extending in said lengthwise direction, for structurally reinforcing said rear body portion, said crushable reinforcement means comprising a quarter panel secured to said rear fender panel so as to form an inner wall of said rear body portion and a belt line reinforcement extending lengthwise of said rear body portion and secured to said quarter panel so as to form said reinforcement means with a closed cross-section, thereby structurally reinforcing said rear body portion in said lengthwise direction; and crush pattern control means, provided in said crushable reinforcement means, for causing an intended lengthwise deformation of said rear body portion in the event of a rear-end collision so as to absorb impact energy of said rear-end collision applied to said automotive vehicle body, said crush pattern control means comprising front crush pattern control means for causing an intended lengthwise deformation of a front half portion of said rear body portion in front of said suspension tower and rear crush pattern control means for causing an intended lengthwise deformation of a rear half portion of said rear body portion behind said suspension tower.

2. A rear body structure as recited in claim 1, wherein said front and rear crush pattern control means are structured so as to allow said crushable reinforcement means to bend oppositely in a transverse direction during a rear-end collision, thereby causing said intended lengthwise deformation of said rear body portion.

3. A rear body structure as recited in claim 2, wherein said front crush pattern control means is provided in a front half portion of said quarter panel in front of said suspension tower and said rear crush pattern control means is provided in a rear half portion of said belt line reinforcement behind said suspension tower.

4. A rear body structure as recited in claim 3, wherein said front crush pattern control means comprises at least one vertical bead formed in said front half portion of said quarter panel which projects toward said belt line reinforcement and said rear crush pattern control means comprises a plurality of vertical beads formed in said rear half portion of said belt line reinforcement and arranged in said lengthwise direction which project toward said quarter panel.

5. A rear body structure as recited in claim 4, wherein said plurality of vertical beads are divided into front and rear groups of vertical beads, the vertical beads of the front group being formed larger in width than the vertical beads of the rear group.

6. A rear body structure as recited in claim 2, wherein said front crush pattern control means is provided in a front half portion of said belt line reinforcement in front of said suspension tower and said rear crush pattern control means is provided in a rear half portion of said quarter panel behind said suspension tower.

7. A rear body structure as recited in claim 6, wherein said front crush pattern control means comprises at least one vertical bead formed in said front half portion of said belt line reinforcement which projects toward said quarter panel and said rear crush pattern control means comprises a plurality of vertical beads formed in said rear half portion of said quarter panel and arranged in said lengthwise direction which project toward said belt line reinforcement.

8. A rear body structure as recited in claim 7, wherein said plurality of vertical beads are divided into front and rear groups of vertical beads, the vertical beads of the front group being formed larger in width than the vertical beads of the rear group.

9. A rear body structure as recited in claim 2, wherein said front crush pattern control means is provided in a front half portion of said quarter panel in front of said suspension tower and said rear crush pattern control means is provided in a rear half portion of said quarter panel behind said suspension tower.

10. A rear body structure as recited in claim 9, wherein said front crush pattern control means comprises at least one vertical bead formed in said front half portion of said quarter panel and said rear crush pattern control means comprises a plurality of vertical beads formed in said rear half portion of said quarter panel and arranged in said lengthwise direction, all of said beads projecting toward said belt line reinforcement.

11. A rear body structure as recited in claim 10, wherein said plurality of vertical beads are divided into front and rear groups of vertical beads, the vertical beads of the front group being formed larger in width than the vertical beads of the rear group.

12. A rear body structure as recited in claim 2, wherein said front crush pattern control means is provided in a front half portion of said belt line reinforcement in front of said suspension tower and said rear crush pattern control means is provided in a rear half portion of said belt line reinforcement behind said suspension tower.

13. A rear body structure as recited in claim 12, wherein said front crush pattern control means comprises at least one vertical bead formed in said front half portion of said belt line reinforcement and said rear crush pattern control means comprises a plurality of vertical beads formed in said rear half portion of said belt line reinforcement and arranged in said lengthwise direction, all of said beads projecting toward said quarter panel.

14. A rear body structure as recited in claim 13, wherein said plurality of vertical beads are divided into front and rear groups of vertical beads, the vertical beads of the front group being formed larger in width than the vertical beads of the rear group.

15. A rear body structure as recited in claim 2, and further comprising reinforcement means, secured to a front end of said crushable reinforcement means, for reinforcing said rear pillar.

16. A rear body structure as recited in claim 15, and further comprising a rear sill extension, integral with said side sill of said automotive vehicle body, for reinforcing a lengthwise stiffness of said rear body portion, said rear sill extension being disposed adjacent to an element which structurally deteriorates during a lengthwise deformation of said rear body portion.

* * * * *